(12) United States Patent
Yedidi et al.

(10) Patent No.: US 12,452,411 B2
(45) Date of Patent: Oct. 21, 2025

(54) ENHANCED VIDEO CODING USING A SINGLE MODE DECISION ENGINE FOR MULTIPLE CODECS

(71) Applicant: Intel Corporation, Santa Clara, CA (US)

(72) Inventors: Satya Yedidi, Roseville, CA (US); Shriram Deshpande, Rancho Cordova, CA (US); Jian Hu, El Dorado Hills, CA (US); Kailash Kamana, Folsom, CA (US); Jakob Saxtorph, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 17/645,674

(22) Filed: Dec. 22, 2021

(65) Prior Publication Data

US 2022/0116595 A1  Apr. 14, 2022

(51) Int. Cl.
| | |
|---|---|
| *H04N 19/107* | (2014.01) |
| *H04N 19/139* | (2014.01) |
| *H04N 19/147* | (2014.01) |
| *H04N 19/176* | (2014.01) |
| *H04N 19/186* | (2014.01) |
| *H04N 19/52*  | (2014.01) |
| *H04N 19/593* | (2014.01) |

(52) U.S. Cl.
CPC ......... *H04N 19/107* (2014.11); *H04N 19/139* (2014.11); *H04N 19/147* (2014.11); *H04N 19/186* (2014.11); *H04N 19/52* (2014.11); *H04N 19/593* (2014.11); *H04N 19/176* (2014.11)

(58) Field of Classification Search
CPC .. H04N 19/107; H04N 19/139; H04N 19/147; H04N 19/186; H04N 19/52; H04N 19/593; H04N 19/176; H04N 19/436; H04N 19/51; H04N 19/105
See application file for complete search history.

(56) References Cited

U.S. PATENT DOCUMENTS

| | | | | |
|---|---|---|---|---|
| 2017/0374366 A1* | 12/2017 | Xiu | ...................... | H04N 19/147 |
| 2018/0077411 A1* | 3/2018 | Gisquet | ............... | H04N 19/197 |
| 2019/0261001 A1* | 8/2019 | Holland | ............... | H04N 19/567 |
| 2019/0297344 A1* | 9/2019 | Holland | ............... | H04N 19/176 |

\* cited by examiner

*Primary Examiner* — Farzana Hossain
(74) *Attorney, Agent, or Firm* — Hanley, Flight & Zimmerman, LLC

(57) ABSTRACT

This disclosure describes systems, methods, and devices related to providing video coding mode decisions to multiple video codecs. A method may include receiving, at a first engine of a graphics processor, intra coding mode candidates associated with generating bitstreams of coded video; receiving, at the first engine, inter coding mode candidates associated with generating the bitstreams; receiving, at the first engine, palette coding mode candidates associated with generating the bitstreams; generating, by the first engine, based on rate distortion estimates associated with the received candidates, coding mode decisions associated with generating the bitstreams; sending, by the first engine, the coding mode decisions to a second engine of the graphics processor and to a third engine of the graphics processor, the second engine using a first codec and the third engine using a second codec different than the first codec; generating the encoded bitstreams based on the coding mode decisions.

18 Claims, 5 Drawing Sheets

ENHANCED VIDEO CODING USING A SINGLE MODE DECISION ENGINE FOR MULTIPLE CODECS

TECHNICAL FIELD

This disclosure generally relates to systems and methods for video coding and, more particularly, to video coding using a single mode decision engine for multiple codecs.

BACKGROUND

Video coding can be a lossy process that sometimes results in reduced quality when compared to original source video. Video coding standards are being developed to improve video quality.

DETAILED DESCRIPTION

Figure 1:
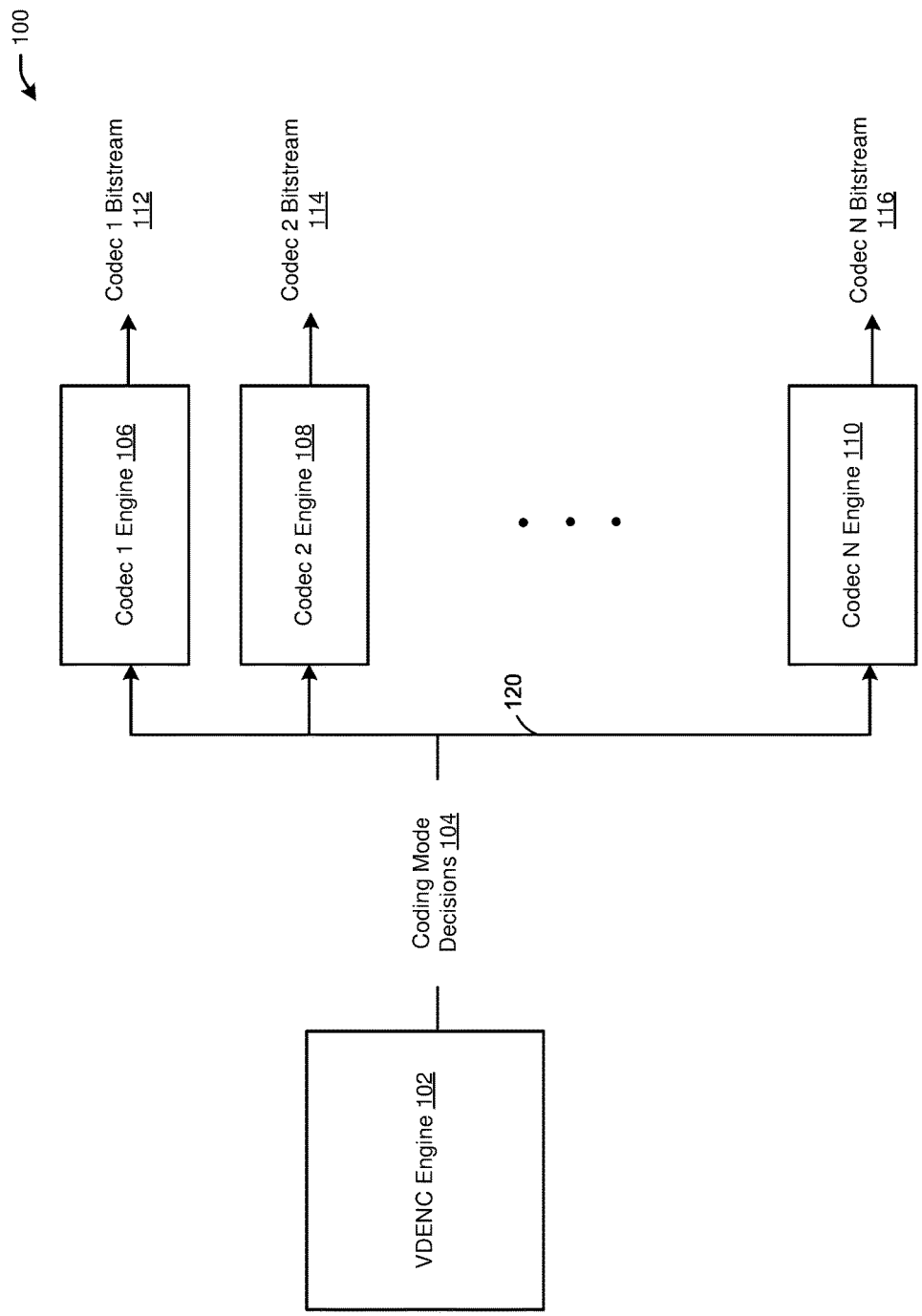
FIG. 1 is an example system illustrating components of encoding hardware, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

A typical video encoding and decoding system may include a transmitting device configured to receive source video and generate compress (e.g., encode) video data of the source video for transmission to a receiving device. This compressed data may be transmitted to the receiving device as a "bit stream." The receiving device may be configured to decode the compressed video data received from the transmitting device. For example, the transmitting device may be a source of video content and the receiving device may be a device on which a viewer is watching the video content (and/or the receiving device may be a third device that may decode the video and provide the decoded video content to the device on which the viewer is watching the video content). The video content at the source may be compressed to maximize video quality and throughput by allowing a video frame including a large number of pixels to be compressed into a smaller amount of data to provide for quicker transmission and processing at the receiving device.

The encoding process may involve at least the following operations. First, a video frame may be received in the form of a number of pixels. The video frame may be separated into different coding units (CU), which may include groups of pixels included in the frame and/or information associated with the pixels, such as luma and chroma information. A predicted block may be generated, which may involve comparing the pixel data associated with the current frame to a reference image, which may be representative of a previously coded frame in the video content (e.g., inter-coding), and/or which may be representative of previously coded pixel data of the same frame (e.g., intra-coding). The predicted block then may be subtracted (e.g., at a subtractor) from the current block of original image data, and the resulting residual (e.g., representing the difference between the predicted block and the original image data) may be partitioned into one or more transform blocks (TUs). The TUs may then be provided to a forward transform stage at which the pixel data included in the TU is converted into a domain of transform coefficients. Following this, the transformed TU is provided to a quantizer stage. Forward transform and the quantizer stages can transform the divided residual data into transform coefficients using discrete cosine transform (DCT) for example. Using a quantization parameter (QP) set by the system, the transform and quantizer then uses lossy resampling or quantization on the coefficients. The frames and residuals along with supporting or context data block size and so forth may be entropy encoded by the coder and transmitted to the receiving device. The forward transform process may involve multiplying the TU matrix (for example, a 4×4 TU would be a matrix including four rows and four columns) by a constant matrix including pre-determined constant values.

The output of the transform and quantizer may be provided to the inverse transform and inverse quantizer to generate the same reconstructed blocks, frames, or other units as would be generated at a decoder such as decoder. Thus, the prediction unit may use the inverse transform and quantizer, adder, and filter to reconstruct the frames.

The prediction unit may perform inter-prediction including motion estimation and motion compensation, intra-prediction including intra prediction mode according to the description herein, a combined inter-intra prediction, and/or a palette prediction. The prediction unit may select the best prediction mode (including intra-modes) for a particular block, typically based on bit-cost and other factors. The prediction unit may select an intra-prediction and/or inter-prediction mode when multiple such modes of each may be available. The prediction output of the prediction unit in the form of a prediction block may be provided both to the subtractor to generate a residual, and in the decoding loop to the adder to add the prediction to the reconstructed residual from the inverse transform to reconstruct a frame. In this regard, an intra feedback loop may exist at the encoder side.

Real-time hardware encoders are common in laptops, mobile phones, and cloud-based systems. Various encoding standards are adopted and used for video streaming. It is a challenge to support multiple encoding standards (e.g., codecs) on a single encoding hardware (e.g., graphics processor), while achieving quality and performance goals (e.g., providing higher-resolution video streams at target bitrates). In particular, graphics processing hardware has a limited silicon area with which to support video coding operations, and it may not be desirable to require a significantly larger graphics processor to provide high-quality video coding performance for use with multiple codecs.

For example, encoding decisions used to encode video have some common characteristics among different CODEC standards. There are multiple types of predictions, Intra prediction (e.g., prediction with respect to previously coded/ decoded data of a current frame), Inter prediction (e.g., prediction with respect to a previously coded/decoded frame), and Palette prediction (e.g., prediction based on palette tables of colors or pixel values of an area, such as a pixel block). The above-mentioned prediction modes consider multiple candidates (e.g., coding modes, motion vectors, palette tables, etc.), along with different coding-block sizes and transform-block sizes. Rate-distortion-estimation may be implemented to select the best candidate and coding-tree decisions, for example, based on a user-chosen combination of bitstream size and video-quality.

Some graphics processors may include encoders with multiple encoding paths. For example, a video box (VD-BOX) of an encoder may have multiple hardware components, including bit packers (PAKs) for respective codecs, and a low-power encoding path referred to as VDENC (video encoder). The VDENC may provide a high-performance encoding engine that does not depend on the graphics processor's execution units and video motion estimator for motion estimation and coding mode decisions. The VDENC provides power and bandwidth savings in addition to encoder pipeline independence, resulting in improved quality of service. However, some codecs use an ENC/PAK (bit packer) structure in which ENC provides the motion search implemented in a graphics processor's execution units, and in which PAK uses the VDBOX, which may be a multi-format video codec. The VDBOX may include a bitstream decoder, the ENC (e.g., intra prediction, motion estimation), and PAK (e.g., quantization, entropy coding, pixel reconstruction, motion compensation). The VDENC is a coding path within the VDBOX that is alternative to the ENC/PAK path.

However, using the VDENC to support encoding operations for multiple codecs on a single chip may not be feasible given the limited hardware size, especially when operating at higher quality modes. For example, in order for a graphics processing unit (GPU) to be equipped with the capability to encode video based on multiple different types of codecs, the GPU may require different hardware engines that are unique to each type of codec. This increases the amount of hardware that is required to be included on the GPU to support these different codecs.

In one or more embodiments, an improved encoder hardware configuration is described herein. The improved hardware configuration may include a hardware engine (e.g., the VDENC) that functions as a single mode-decision engine that performs operations that are common to all video codecs supported by a graphics processor, and provides the coding mode decisions to multiple codecs of a same graphics processor using a common interface. This reduces the number of hardware elements included in any codec-specific hardware engines. For example, rather than including individual codec engines that each include the hardware required to perform all of the common operations and the codec-specific operations, only one instance of the hardware needed to perform the common operations may be provided as a single hardware engine, and the output of this single hardware engine may then be provided to a relevant codec-specific hardware engine to perform any remaining codec-specific operations depending on the particular video codec that is being used.

In one or more embodiments, the video coding operations common to the video encoding codecs may include at least intra prediction, inter prediction, palette prediction, and/or rate-distortion-estimation. These operations may produce coding-block tree, transform tree and prediction mode decisions. These common operations serve to consider multiple candidates, along with different coding-block size and transform-block sizes. The final mode decisions are passed to different PAK pipelines, through a common interface, to produce AVC, HEVC, VP9, AV1 and VVC compliant bitstreams, for example.

In one or more embodiments, for inter prediction, there may be two main categories, new motion vectors from inter search, or motion vectors borrowed from spatial or temporal neighbors, through a Merge Candidate search. Palette prediction has its own unique algorithm to find matching pixels from an established palette table. The single hardware engine can search all major types of candidates, across different CU size, TU size, CU partitions, etc. The search operations may be performed by individual Intra Candidate Search, Merge Candidate Search, Inter Candidate Searches, and Palette Searches. Each search may produce multiple candidates, based on a preliminary comparison (e.g., sum of all differences), along with associated residual data. The data from the search engines may be used for bit-cost calculations and final mode-decisions, for example, in a Rate-Distortion Estimation (RDE) engine of the graphics processor. The final RDE winner may be the best candidate across Intra/Merge/Inter/Palette searches, along with the best CU size, TU size, for minimized bitstream size under target configuration. The selected candidates, CU size, and TU size may be provided to one or more of the multiple codec pipelines supported by the graphics processor.

In one or more embodiments, the rate-distortion-estimation may be utilized to find the best candidate and coding-tree decisions, which may be based on a user-chosen combination of bitstream size and video-quality. By exploring this commonality, a decision engine is employed that performs intra search with multiple candidates on CU32, CU16, CU8, PU4×4, performs inter search with ×8 down-sample, ×4 down-sample, ×1 and fractional pixel search, and/or performs RDE cost calculations. Additional adjustments and features are added to the pipeline, to accommodate differences between AVC, HEVC, VP9, AV1 and VVC Codec standards. A common PAK object (OBJ) interface is defined to pass final mode-decisions to PAK pipelines, which will in turn produce CODEC standard compliant bitstream.

In one or more embodiments the enhancements described herein allow a single hardware engine of a graphics processor to support any different number of video encoding codecs. With some customization, the single engine can make mode decisions for different video codecs, with configurable quality and performance. This single engine can be further customized to support new codecs that emerge in the future. This flexibility make this improved hardware an expandable solution for video encoding. Furthermore, the improved hardware configuration will significantly reduce silicon area, power costs, development and validation efforts for supporting multiple encoding standards, including AVC, HEVC, VP9, AV1 and VVC, and/or any other codec. The common PAK OBJ interface also may allow encoding mode-decisions to be streamed-out to user software for user-defined adjustments and statistic collection.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is an example system 100 illustrating components of encoding hardware, according to some example embodiments of the present disclosure.

Figure 5:
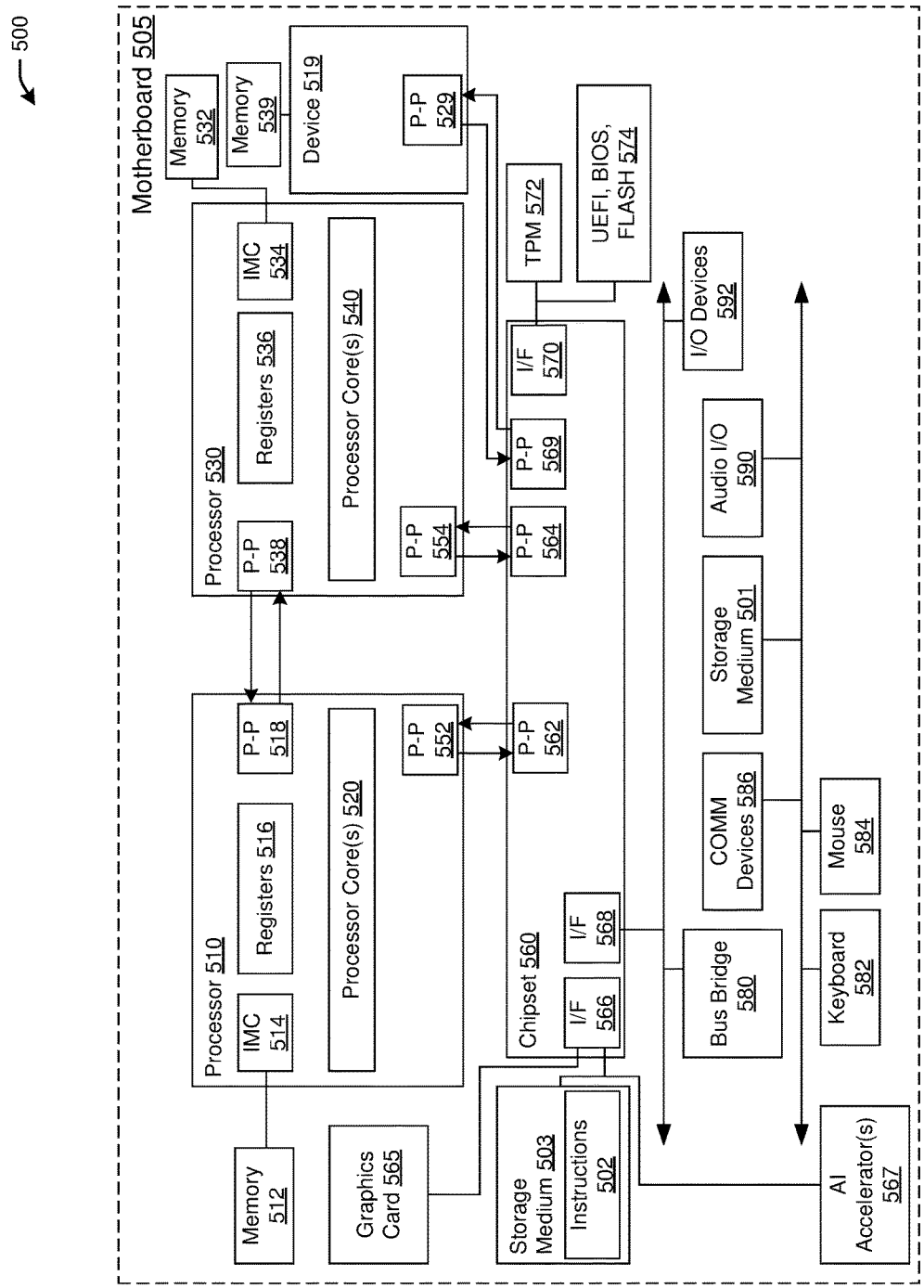
FIG. 5 illustrates an embodiment of an exemplary system, in accordance with one or more example embodiments of the present disclosure.

Referring to FIG. 1, the system 100 may include a VDENC engine 102, which may represent an encoding path of a graphics processor (e.g., graphics card 565 of FIG. 5). The VDENC engine 102 may generate coding mode decisions 104 for multiple video codecs supported by the graphics processor. For example, a first codec engine 106 may apply one coding standard, a second codec engine 108 may apply another coding standard, and so on up to N encoders, where the Nth codec engine 110 applies another coding standard. The respective codec engines may apply any respective coding standard, such as AVC, HEVC, VP9, AV1 and VVC, and/or any other codec. For example, the first codec engine 106 may generate a first bitstream 112 based on a first coding standard. The second codec engine 108 may generate a second bitstream 114 based on a second coding standard. The Nth codec engine 110 may generate an Nth bitstream 116 based on an Nth coding standard. In this manner, the VDENC engine 102 may generate the coding mode decisions 104 for any of the codec engines to apply. The coding mode decisions 104 may include decisions about CU size, CU partition, TU size, Prediction Mode, Intra Angle, Motion Vector, Palette tables, and the like. The VDENC engine 102 may send the coding mode decisions 104 to the respective code engines using a common interface 120 (e.g., rather than only supporting a single codec or each codec using a separate interface).

Figure 2:
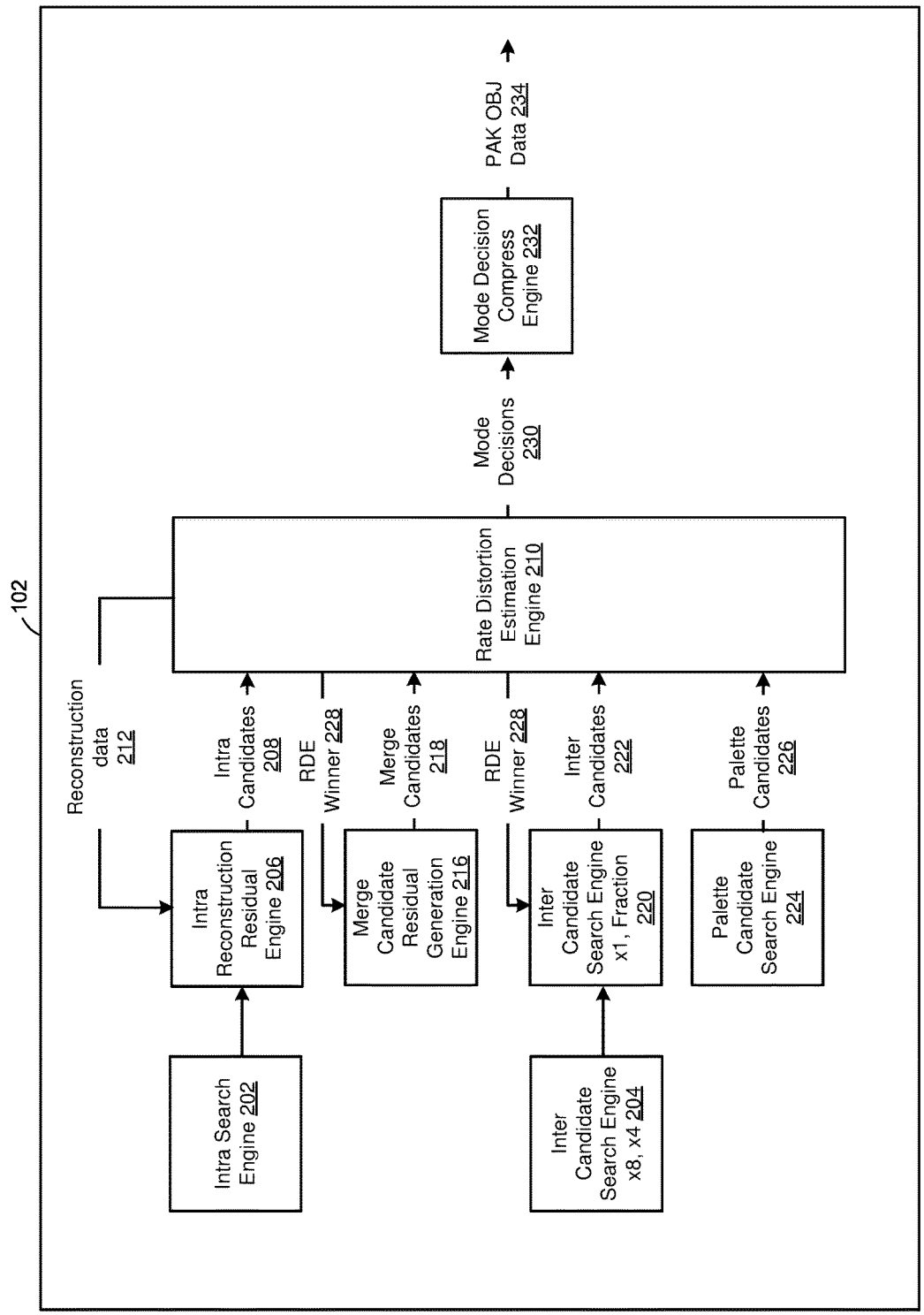
FIG. 2 depicts exemplary components of the mode decision engine of the system of FIG. 1, in accordance with one or more example embodiments of the present disclosure.

FIG. 2 depicts exemplary components of the VDENC engine 102 of the system 100 of FIG. 1, in accordance with one or more example embodiments of the present disclosure.

Referring to FIG. 2, the VDENC engine 102 may support the different respective codec engines of FIG. 1 by including an Intra search engine 202 and an Inter candidate search engine 204 for ×8 and ×4 down-sampling, and an Intra reconstruction residual engine 206 (e.g., to measure the residual—difference—between a reconstructed frame and the original frame). The Intra search engine 202 and the Intra reconstruction residual engine 206 may generate Intra candidates 208 (e.g., Intra coding mode candidates) along with different coding block sizes and transform block sizes for consideration by a RDE engine 210. The RDE engine 210 may provide reconstruction data 212 to the Intra reconstruction residual engine 206 to use when determining the residual between a reconstructed frame and the original frame. The VDENC engine 102 may include merge candidate residual generation engine 216 with which to generate merge candidates 218 (e.g., motion vectors) for consideration by the RDE engine 210. The Inter candidate search engine 204 for ×8 and ×4 down-sampling and an Inter candidate search engine 220 for ×1 and fraction down-sampling may generate Inter candidates 222 (e.g., Inter coding modes) for consideration by the RDE engine 210. The VDENC engine 102 may include a Palette candidate search engine 224 to generate Palette mode candidates 226 (e.g., Palette tables) for consideration by the RDE engine 210. The candidates may be potential encodings for a given pixel block, and each mode (e.g., Intra, Inter, and Palette may have its own candidates as shown).

Still referring to FIG. 2, the RDE engine 210 may select an RDE winner 228, representing the best candidate across the Intra, Merge, Inter, and Palette modes. The RDE engine 210 may generate mode decisions 230, including the RDE winner 228 and optimal CU and TU sizes to minimize the bitstream size based on a target configuration. A mode decision compress engine 232 may, based on the mode decisions 230, generate PAK OBJ data 234 (e.g., instructions for the respective codec engines of FIG. 1 to code using the mode decisions 230). In this manner, the mode decisions 230 and the PAK OBJ data 234 represent the coding mode decisions 104 of FIG. 1 sent to the codec engines, instructing the codec engines to encode video using the mode decisions 230. The mode decisions 230 may include coding modes, motion vectors, and Palette tables.

In one or more embodiments, the RDE engine 210 may generate the mode decisions 230 based on a rate distortion optimized cost. The RDE engine 210 may determine the cost using a forward transform and quantization technique based on the respective candidates for the different modes. The RDE engine 210 may estimate the number of bits used to transmit a pixel block based on an amount of error to correct. The cost may be based on the amount of error to correct. In this manner, rather than the VDENC engine 102 generating separate mode decisions for individual codec PAKs supported by the graphics processor (e.g., and using separate interfaces), the VDENC engine 102 generates the mode decisions 230 for multiple codecs supported by a same graphics processor, and sends the mode decisions 230 to the codecs using the common interface 120 of FIG. 1. Accordingly, the VDENC engine 102 may function as a single mode-decision engine that supports multiple codecs of a same graphics processor.

Figure 3:
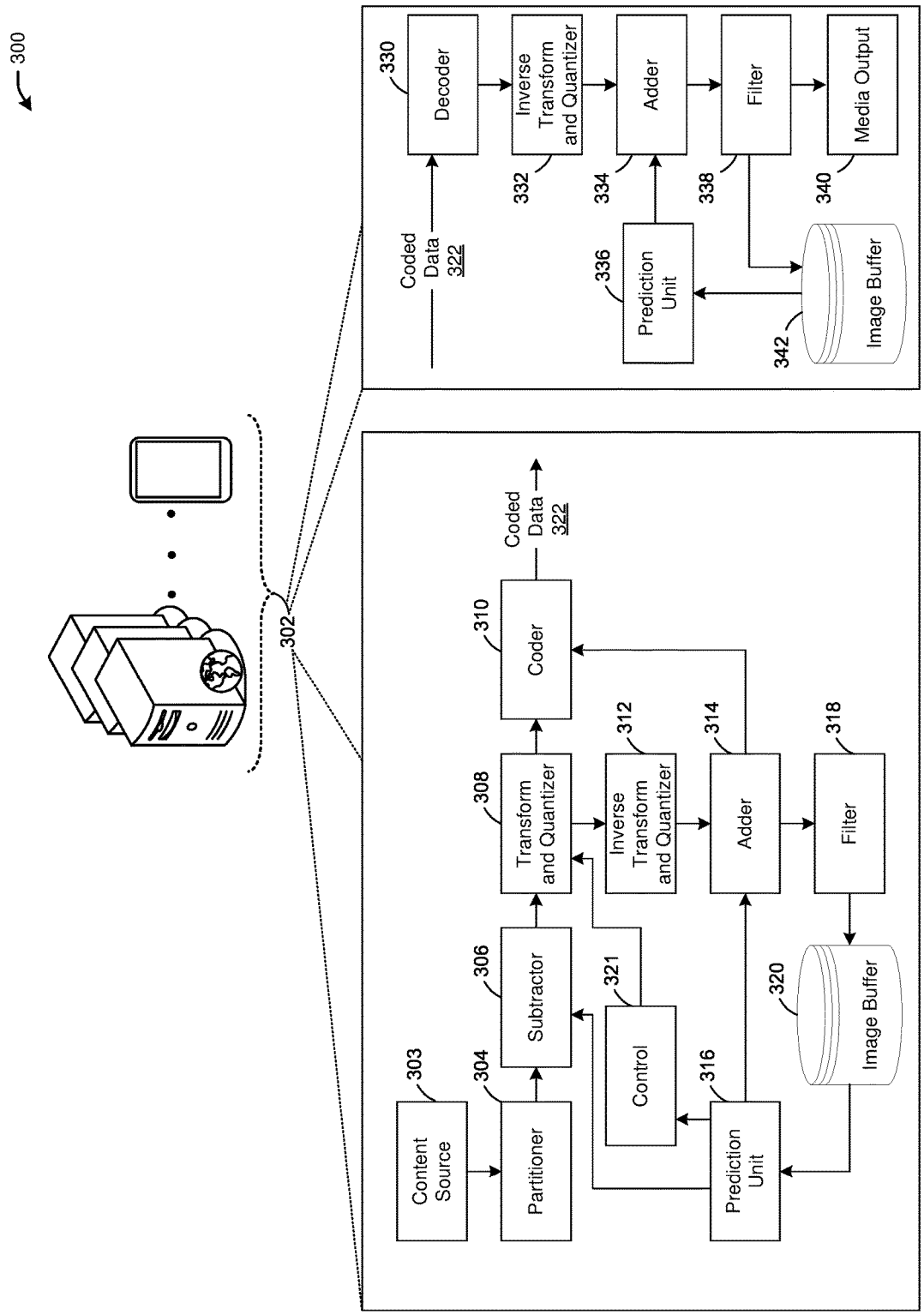
FIG. 3 is an example system illustrating components of encoding and decoding devices, according to some example embodiments of the present disclosure.

FIG. 3 is an example system 300 illustrating components of encoding and decoding devices, according to some example embodiments of the present disclosure.

Referring to FIG. 3, the system 300 may include devices 302 having encoder and/or decoder components. As shown, the devices 302 may include a content source 303 that provides video and/or audio content (e.g., a camera or other image capture device, stored images/video, etc.). The content source 303 may provide media (e.g., video and/or audio) to a partitioner 304, which may prepare frames of the content for encoding. A subtractor 306 may generate a residual as explained further herein. A transform and quantizer 308 may generate and quantize transform units to facilitate encoding by a coder 310 (e.g., entropy coder). Transform and quantized data may be inversely transformed and inversely quantized by an inverse transform and quantizer 312. An adder 314 may compare the inversely transformed and inversely quantized data to a prediction block generated by a prediction unit 316, resulting in reconstructed frames. A filter 318 (e.g., in-loop filter for resizing/cropping, color conversion, de-interlacing, composition/blending, etc.) may revise the reconstructed frames from the adder 314, and may store the reconstructed frames in an image buffer 320 for use by the prediction unit 316. A control 321 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 316. Using the encoding aspects, the transform and quantizer 308 may generate and quantize transform units to facilitate encoding by the coder 310, which may generate coded data 322 that may be transmitted (e.g., an encoded bitstream).

Still referring to FIG. 3, the devices 302 may receive coded data (e.g., the coded data 322) in a bitstream, and a decoder 330 may decode the coded data, extracting quantized residual coefficients and context data. An inverse transform and quantizer 332 may reconstruct pixel data based on the quantized residual coefficients and context data. An adder 334 may add the residual pixel data to a predicted block generated by a prediction unit 336. A filter 338 may filter the resulting data from the adder 334. The filtered data may be output by a media output 340, and also may be stored as reconstructed frames in an image buffer 342 for use by the prediction unit 336.

Referring to FIG. 3, the system 300 performs the methods of intra prediction disclosed herein, and is arranged to perform at least one or more of the implementations described herein including intra block copying. In various implementations, the system 300 may be configured to undertake video coding and/or implement video codecs according to one or more standards. Further, in various forms, video coding system 300 may be implemented as part of an image processor, video processor, and/or media processor and undertakes inter-prediction, intra-prediction, predictive coding, and residual prediction. In various implementations, system 500 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 300 and/or other systems, schemes or processes may be described herein, the present disclosure is not necessarily always limited to any particular video coding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 300 may be an encoder where current video information in the form of data related to a sequence of video frames may be received to be compressed. By one form, a video sequence (e.g., from the content source 303) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 304 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 300 may receive an input frame from the content source 303. The input frames may be frames sufficiently pre-processed for encoding.

The system 300 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 308 may be provided to the inverse transform and quantizer 312 to generate the same reference or reconstructed blocks, frames, or other units as would be generated at a decoder such as decoder 330. Thus, the prediction unit 316 may use the inverse transform and quantizer 312, adder 314, and filter 318 to reconstruct the frames.

The prediction unit may perform inter-prediction including motion estimation and motion compensation, intra-prediction according to the description herein, and/or a combined inter-intra prediction. The prediction unit 316 may select the best prediction mode (including intra-modes) for a particular block, typically based on bit-cost and other factors. The prediction unit 316 may select an intra-prediction and/or inter-prediction mode when multiple such modes of each may be available. The prediction output of the prediction unit 316 in the form of a prediction block may be provided both to the subtractor 306 to generate a residual, and in the decoding loop to the adder 314 to add the prediction to the reconstructed residual from the inverse transform to reconstruct a frame.

The partitioner 304 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 316 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 316 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 316 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 306 from the current block of original image data, and the resulting residual may be partitioned into one or more transform blocks (TUs) so that the transform and quantizer 308 can transform the divided residual data into transform coefficients using discrete cosine transform (DCT) for example. Using the quantization parameter (QP) set by the system 300, the transform and quantizer 308 then uses lossy resampling or quantization on the coefficients. The frames and residuals along with supporting or context data block size and intra displacement vectors and so forth may be entropy encoded by the coder 310 and transmitted to decoders.

In one or more embodiments, a system 300 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 300 may process the bitstream with an entropy decoder 330 to extract the quantized residual coefficients as well as the context data. The system 300 then may use the inverse transform and quantizer 332 to reconstruct the residual pixel data.

The system 300 then may use an adder 334 (along with assemblers not shown) to add the residual to a predicted block. The system 300 also may decode the resulting data using a decoding technique employed depending on the coding mode indicated in syntax of the bitstream, and either a first path including a prediction unit 336 or a second path that includes a filter 338. The prediction unit 336 performs intra-prediction by using reference block sizes and the intra displacement or motion vectors extracted from the bitstream, and previously established at the encoder. The prediction unit 336 may utilize reconstructed frames as well as inter-prediction motion vectors from the bitstream to reconstruct a predicted block. The prediction unit 336 may set the correct prediction mode for each block, where the prediction mode may be extracted and decompressed from the compressed bitstream.

In one or more embodiments, the coded data 322 may include both video and audio data. In this manner, the system 300 may encode and decode both audio and video.

In one or more embodiments, while the coder 310 is generating the coded data 322, the system 300 may generate coding quality metrics indicative of visual quality (e.g., without requiring post-processing of the coded data 322 to assess the visual quality). Assessing the coding quality metrics may allow a control feedback such as BRC (e.g., facilitated by the control 321) to compare the number of bits spent to encode a frame to the coding quality metrics. When one or more coding quality metrics indicate poor quality (e.g., fail to meet a threshold value), such may require re-encoding (e.g., with adjusted parameters). The coding quality metrics may be based on a comparison of coded video to source video. The system 300 may compare a decoded version of the encoded image data to a pre-encoded version of the image data. Using the CUs or MBs of the encoded image data and the pre-encoded version of the image data, the system 300 may generate the coding quality metrics, which may be used as metadata for the corresponding video frames. The system 300 may use the coding quality metrics to adjust encoding parameters, for example, based on a perceived human response to the encoded video.

In one or more embodiments, the VDENC engine 102 of FIG. 1 may function as the prediction units 316 and 336 in that the VDENC engine 102 may generate the decisions to be used in the encoding/decoding. The bitstream coding, quantization, entropy coding, pixel reconstruction, and motion compensation may be performed by a PAK engine (e.g., the respective codec engines of FIG. 1). In this manner, the encoding and decoding components of FIG. 3 may represent a single codec pipeline, and the VDENC engine 102 may function as a common mode decision engine for multiple codec pipelines, sending the coding mode decisions 104 of FIG. 1 to multiple codecs as shown in FIG. 1.

Therefore, instead of replicating FIG. 3 for multiple codec pipelines (e.g., each codec pipeline having its own encoding components of FIG. 3), resulting in multiple mode decision engines (e.g., a prediction unit for each code pipeline) or each coding mode decision made for a single respective codec, the VDENC engine 102 may provide the coding mode decisions to the multiple codec pipelines.

It is understood that the above descriptions are for purposes of illustration and are not meant to be limiting.

Figure 4:
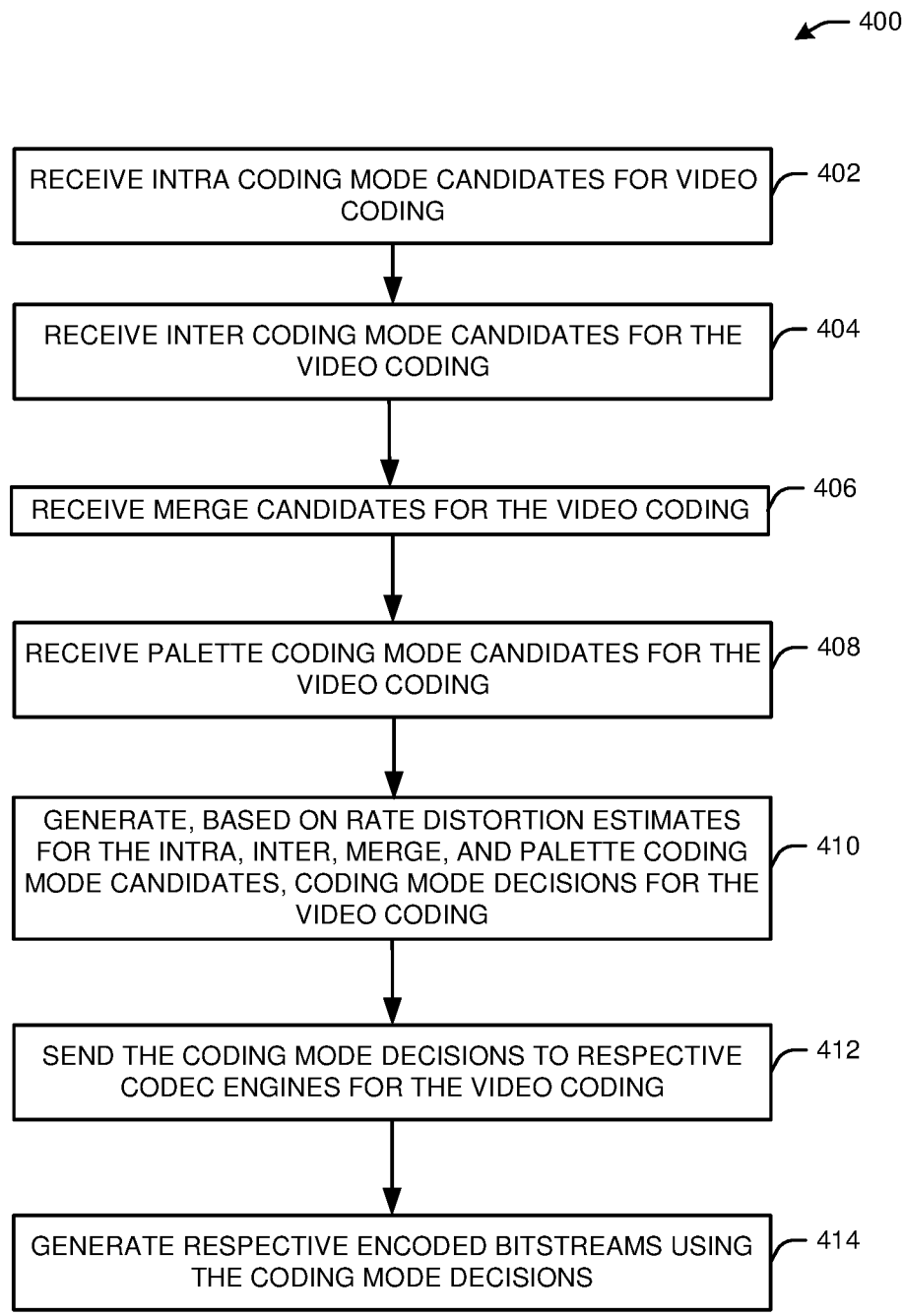
FIG. 4 illustrates a flow diagram of an illustrative process for video coding using a single mode decision engine for multiple codecs, in accordance with one or more example embodiments of the present disclosure.

FIG. 4 illustrates a flow diagram of illustrative process 400 for video coding using a single mode decision engine for multiple codecs, in accordance with one or more example embodiments of the present disclosure.

At block 402, a device (e.g., the graphics card 565 of FIG. 5) may receive, at a first engine (e.g., the VDENC engine 102 of FIG. 1) Intra coding mode candidates (e.g., the Intra candidates 208 of FIG. 2) from an Intra coding mode engine. At block 404, the device may receive Inter coding mode candidates (e.g., the Inter candidates 222 of FIG. 2) from and Inter coding mode engine. At block 406, the device may receive merge candidates for video coding (e.g., the merge candidates 218 of FIG. 2) from a merge mode engine. At block 408, the device may receive Palette mode candidates (e.g., the Palette mode candidates 226 of FIG. 2) from a Palette mode engine. Encoding decisions have some common characteristics among different codecs. There are three major type of predictions, Intra prediction, Inter prediction and Palette prediction. All of them consider multiple candidates, along with different coding-block size and transform-block size. By exploring this commonality, an engine may perform Intra Search with multiple candidates on CU32, CU16, CU8, PU4×4, and Inter Search with ×8 down-sample, ×4 down-sample, ×1 and fractional pixel search.

At block 410, the device may generate, based on rate distortion estimates for the received candidates, coding mode decisions for codecs to apply when generating encoded bitstreams. The first engine may use rate-distortion estimation to find the best candidates and coding-tree decisions, based on user-chosen combinations of bitstream size and video-quality. A rate distortion engine of the first engine (e.g., the RDE engine 210 of FIG. 2) may generate mode decisions, including the RDE winner and optimal CU and TU sizes to minimize the bitstream size based on a target configuration. In one or more embodiments, first engine may generate the mode decisions based on a rate distortion optimized cost. The first engine may determine the cost using a forward transform and quantization technique based on the respective candidates for the different modes. The first engine may estimate the number of bits used to transmit a pixel block based on an amount of error to correct. The cost may be based on the amount of error to correct.

At block 412, the device may send the coding mode decisions to multiple additional engines, each using a different respective coded (e.g., as shown in FIG. 1). The coding mode decisions may be sent to the different codec engines using a common interface between them and the first engine. In this manner, when the first engine generates mode decisions, the first engine may send the mode decision to multiple codec engines (e.g., as opposed to one set of decisions sent to one codec engine, and as opposed to each codec engine using a different engine to generate respective coding mode decisions).

At block 414, the additional engines may use final coding mode decisions (e.g., at least a subset of the coding mode decisions) to generate encoded bitstreams according to the respective codec used by a respective codec engine of the additional engines. In this manner, the one codec engine may receive the same coding mode decisions as another codec engine using a common interface from a common engine (e.g., the first engine).

It is understood that the above descriptions are for purposes of illustration and are not meant to be limiting.

FIG. 5 illustrates an embodiment of an exemplary system 500, in accordance with one or more example embodiments of the present disclosure.

In various embodiments, the system 500 may comprise or be implemented as part of an electronic device.

In some embodiments, the system 500 may be representative, for example, of a computer system that implements one or more components of FIGS. 1 and 2.

The embodiments are not limited in this context. More generally, the system 500 is configured to implement all logic, systems, processes, logic flows, methods, equations, apparatuses, and functionality described herein and with reference to the figures.

The system 500 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 500 may have a single processor with one core or more than one processor. Note that the term "processor" refers to a processor with a single core or a processor package with multiple processor cores.

In at least one embodiment, the computing system 500 is representative of one or more components of FIG. 1. More generally, the computing system 500 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 500. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 500 comprises a motherboard 505 for mounting platform components. The motherboard 505 is a point-to-point (P-P) interconnect platform that includes a processor 510, a processor 530 coupled via a P-P interconnects/interfaces as an Ultra Path Interconnect (UPI), and a device 519. In other embodiments, the system 500 may be of another bus architecture, such as a multi-drop bus. Furthermore, each of processors 510 and 530 may be processor packages with multiple processor cores. As an example, processors 510 and 530 are shown to include processor core(s) 520 and 540, respectively. While the system 500 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 510 and the chipset 560. Some platforms may include additional components and some platforms may only include sockets to mount the processors and/or the chipset.

The processors 510 and 530 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 510, and 530.

The processor 510 includes an integrated memory controller (IMC) 514 and P-P interconnects/interfaces 518 and 552. Similarly, the processor 530 includes an IMC 534 and P-P interconnects/interfaces 538 and 554. The WIC's 514 and 534 couple the processors 510 and 530, respectively, to respective memories, a memory 512, and a memory 532. The memories 512 and 532 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 512 and 532 locally attach to the respective processors 510 and 530.

In addition to the processors 510 and 530, the system 500 may include a device 519. The device 519 may be connected to chipset 560 by means of P-P interconnects/interfaces 529 and 569. The device 519 may also be connected to a memory 539. In some embodiments, the device 519 may be connected to at least one of the processors 510 and 530. In other embodiments, the memories 512, 532, and 539 may couple with the processor 510 and 530, and the device 519 via a bus and shared memory hub.

System 500 includes chipset 560 coupled to processors 510 and 530. Furthermore, chipset 560 can be coupled to storage medium 503, for example, via an interface (I/F) 566. The I/F 566 may be, for example, a Peripheral Component Interconnect-enhanced (PCI-e). The processors 510, 530, and the device 519 may access the storage medium 503 through chipset 560.

Storage medium 503 may comprise any non-transitory computer-readable storage medium or machine-readable storage medium, such as an optical, magnetic, or semiconductor storage medium. In various embodiments, storage medium 503 may comprise an article of manufacture. In some embodiments, storage medium 503 may store computer-executable instructions, such as computer-executable instructions 502 to implement one or more of processes or operations described herein, (e.g., process 400 of FIG. 4). The storage medium 503 may store computer-executable instructions for any equations depicted above. The storage medium 503 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 510 couples to a chipset 560 via P-P interconnects/interfaces 552 and 562 and the processor 530 couples to a chipset 560 via P-P interconnects/interfaces 554 and 564. Direct Media Interfaces (DMIs) may couple the P-P interconnects/interfaces 552 and 562 and the P-P interconnects/interfaces 554 and 564, respectively. The DMI may be a high-speed interconnect that facilitates, e.g., eight Giga Transfers per second (GT/s) such as DMI 3.0. In other embodiments, the processors 510 and 530 may interconnect via a bus.

The chipset 560 may comprise a controller hub such as a platform controller hub (PCH). The chipset 560 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 560 may comprise more than one controller hub such as a chipset with a memory controller hub, a graphics controller hub, and an input/output (I/O) controller hub.

In the present embodiment, the chipset 560 couples with a trusted platform module (TPM) 572 and the UEFI, BIOS, Flash component 574 via an interface (I/F) 570. The TPM 572 is a dedicated microcontroller designed to secure hardware by integrating cryptographic keys into devices. The UEFI, BIOS, Flash component 574 may provide pre-boot code.

Furthermore, chipset 560 includes the I/F 566 to couple chipset 560 with a high-performance graphics engine, graphics card 565. The graphics card 565 may implement one or more of processes or operations described herein, (e.g., process 400 of FIG. 4) and may include components of FIGS. 1-3. Because of the enhancements described herein to the graphics card 565, the graphics card 565 may generate human visual quality metrics for encoded video frames without having to offload the metrics generation, and may identify and select optimal encoding parameters within the graphics card 565. In other embodiments, the system 500 may include a flexible display interface (FDI) between the processors 510 and 530 and the chipset 560. The FDI interconnects a graphics processor core in a processor with the chipset 560.

Various I/O devices 592 couple to the bus 581, along with a bus bridge 580 that couples the bus 581 to a second bus 591 and an I/F 568 that connects the bus 581 with the chipset 560. In one embodiment, the second bus 591 may be a low pin count (LPC) bus. Various devices may couple to the second bus 591 including, for example, a keyboard 582, a mouse 584, communication devices 586, a storage medium 501, and an audio I/O 590.

The artificial intelligence (AI) accelerator 567 may be circuitry arranged to perform computations related to AI. The AI accelerator 567 may be connected to storage medium 501 and chipset 560. The AI accelerator 567 may deliver the processing power and energy efficiency needed to enable abundant data computing. The AI accelerator 567 is a class of specialized hardware accelerators or computer systems designed to accelerate artificial intelligence and machine learning applications, including artificial neural networks and machine vision. The AI accelerator 567 may be applicable to algorithms for robotics, internet of things, other data-intensive and/or sensor-driven tasks.

Many of the I/O devices 592, communication devices 586, and the storage medium 501 may reside on the motherboard 505 while the keyboard 582 and the mouse 584 may be add-on peripherals. In other embodiments, some or all the I/O devices 592, communication devices 586, and the storage medium 501 are add-on peripherals and do not reside on the motherboard 505.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Example 1 may be a method for providing video coding mode decisions to multiple video codecs, the method comprising: receiving, at a first engine of a graphics processor, intra coding mode candidates associated with generating bitstreams of coded video; receiving, at the first engine, inter coding mode candidates associated with generating the bitstreams; receiving, at the first engine, palette coding mode candidates associated with generating the bitstreams; selecting, by the first engine, based on rate distortion estimates associated with the intra coding mode candidates, the inter coding mode candidates, and the palette coding mode candidates, coding mode decisions associated with generating the bitstreams; sending, by the first engine, the coding mode decisions to a second engine of the graphics processor and to a third engine of the graphics processor, the second engine using a first codec and the third engine using a second codec different than the first codec; generating, by the second engine, based on the coding mode decisions and the first codec, a first encoded bitstream of the bitstreams; and generating, by the third engine, based on the coding mode decisions and the second codec, a second encoded bitstream of the bitstreams.

Example 2 may include the method of example 1 and/or some other example herein, wherein sending the coding mode decisions comprises sending the coding mode decisions to the second engine using an interface, and sending the coding mode decisions to the third engine using the interface.

Example 3 may include the method of example 1 and/or some other example herein, wherein generating the first encoded bitstream is based on a first coding mode decision of the coding mode decisions, wherein generating the second encoded bitstream is based on a second coding mode decision of the coding mode decisions, and wherein the first coding mode decision and the second coding mode decision are optimized coding mode decisions of the coding mode decisions.

Example 4 may include the method of example 1 and/or some other example herein, wherein the intra coding mode candidates are received from an intra coding mode engine of the first engine, wherein the inter coding mode candidates are received from an inter coding mode engine of the first engine, and wherein the palette coding mode candidates are received from a palette coding mode engine of the first engine.

Example 5 may include the method of example 1 and/or some other example herein, further comprising receiving, at the first engine, candidate motion vectors associated with generating the bitstreams, wherein selecting the coding mode decisions is further based on the candidate motion vectors.

Example 6 may include the method of example 5 and/or some other example herein, wherein the candidate motion vectors are received from a first intra coding mode engine of the first engine, and wherein the intra coding mode candidates are received from a second intra coding mode engine of the first engine.

Example 7 may include the method of example 1 and/or some other example herein, wherein the coding mode decisions comprise a coding unit size, a coding unit partition, a transform unit size, a prediction mode, an intra coding mode angle, a motion vector, and a palette table.

Example 8 may include a non-transitory computer-readable medium storing computer-executable instructions which when executed by one or more processors result in performing operations comprising: receiving, at a first engine of the graphics processor, intra coding mode candidates associated with generating bitstreams of coded video; receiving, at the first engine, inter coding mode candidates associated with generating the bitstreams; receiving, at the first engine, palette coding mode candidates associated with generating the bitstreams; selecting, by the first engine, based on rate distortion estimates associated with the intra coding mode candidates, the inter coding mode candidates, and the palette coding mode candidates, coding mode decisions associated with generating the bitstreams; sending, by the first engine, the coding mode decisions to a second engine of the graphics processor and to a third engine of the graphics processor, the second engine using a first codec and the third engine using a second codec different than the first codec; generating, by the second engine, based on the coding mode decisions and the first codec, a first encoded bitstream of the bitstreams; and generating, by the third engine, based on the coding mode decisions and the second codec, a second encoded bitstream of the bitstreams.

Example 9 may include the non-transitory computer-readable medium of example 8 and/or some other example herein, wherein sending the coding mode decisions comprises sending the coding mode decisions to the second engine using an interface, and sending the coding mode decisions to the third engine using the interface.

Example 10 may include the non-transitory computer-readable medium of example 8 and/or some other example herein, wherein generating the first encoded bitstream is based on a first coding mode decision of the coding mode decisions, wherein generating the second encoded bitstream is based on a second coding mode decision of the coding mode decisions, and wherein the first coding mode decision and the second coding mode decision are optimized coding mode decisions of the coding mode decisions.

Example 11 may include the non-transitory computer-readable medium of example 8 and/or some other example herein, wherein the intra coding mode candidates are received from an intra coding mode engine of the first engine, wherein the inter coding mode candidates are received from an inter coding mode engine of the first engine, and wherein the palette coding mode candidates are received from a palette coding mode engine of the first engine.

Example 12 may include the non-transitory computer-readable medium of example 8 and/or some other example herein, the operations further comprising: receiving, at the first engine, candidate motion vectors associated with generating the bitstreams, wherein selecting the coding mode decisions is further based on the candidate motion vectors.

Example 13 may include the non-transitory computer-readable medium of example 12 and/or some other example herein, wherein the candidate motion vectors are received from a first intra coding mode engine of the first engine, and wherein the intra coding mode candidates are received from a second intra coding mode engine of the first engine.

Example 14 may include the non-transitory computer-readable medium of example 8 and/or some other example herein, wherein the coding mode decisions comprise a coding unit size, a coding unit partition, a transform unit size, a prediction mode, an intra coding mode angle, a motion vector, and a palette table.

Example 15 may include a system for providing video coding mode decisions to multiple video codecs, the system comprising at least one graphics processor coupled to memory, the at least one graphics processor configured to: receive, at a first engine of the graphics processor, intra coding mode candidates associated with generating bitstreams of coded video; receive, at the first engine, inter coding mode candidates associated with generating the bitstreams; receive, at the first engine, palette coding mode candidates associated with generating the bitstreams; select, by the first engine, based on rate distortion estimates associated with the intra coding mode candidates, the inter coding mode candidates, and the palette coding mode candidates, coding mode decisions associated with generating the bitstreams; send, by the first engine, the coding mode decisions to a second engine of the graphics processor and to a third engine of the graphics processor, the second engine using a first codec and the third engine using a second codec different than the first codec; generate, by the second engine, based on the coding mode decisions and the first codec, a first encoded bitstream of the bitstreams; and generate, by the third engine, based on the coding mode decisions and the second codec, a second encoded bitstream of the bitstreams.

Example 16 may include the system of example 15 and/or some other example herein, wherein to send the coding mode decisions comprises to send the coding mode decisions to the second engine using an interface, and to send the coding mode decisions to the third engine using the interface.

Example 17 may include the system of example 15 and/or some other example herein, wherein to generate the first encoded bitstream is based on a first coding mode decision of the coding mode decisions, wherein to generate the second encoded bitstream is based on a second coding mode decision of the coding mode decisions, and wherein the first coding mode decision and the second coding mode decision are optimized coding mode decisions of the coding mode decisions.

Example 18 may include the system of example 17 and/or some other example herein, wherein the intra coding mode candidates are received from an intra coding mode engine of the first engine, wherein the inter coding mode candidates are received from an inter coding mode engine of the first engine, and wherein the palette coding mode candidates are received from a palette coding mode engine of the first engine.

Example 19 may include the system of example 17 and/or some other example herein, wherein the at least one processor is further configured to: receive, at the first engine, candidate motion vectors associated with generating the bitstreams, wherein to select the coding mode decisions is further based on the candidate motion vectors.

Example, 20 may include the system of example 19 and/or some other example herein, wherein the candidate motion vectors are received from a first intra coding mode engine of the first engine, and wherein the intra coding mode candidates are received from a second intra coding mode engine of the first engine.

Example 21 may include an apparatus comprising means for: receiving, at a first engine of a graphics processor, intra coding mode candidates associated with generating bitstreams of coded video; receiving, at the first engine, inter coding mode candidates associated with generating the bitstreams; receiving, at the first engine, palette coding mode candidates associated with generating the bitstreams; selecting, by the first engine, based on rate distortion estimates associated with the intra coding mode candidates, the inter coding mode candidates, and the palette coding mode candidates, coding mode decisions associated with generating the bitstreams; sending, by the first engine, the coding mode decisions to a second engine of the graphics processor and to a third engine of the graphics processor, the second engine using a first codec and the third engine using a second codec different than the first codec; generating, by the second engine, based on the coding mode decisions and the first codec, a first encoded bitstream of the bitstreams; and generating, by the third engine, based on the coding mode decisions and the second codec, a second encoded bitstream of the bitstreams.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
   generating intra coding mode candidates associated with a source video;
   generating inter coding mode candidates associated with the source video;
   generating palette coding mode candidates associated with the source video;
   selecting a coding mode decision associated with the source video based on rate distortion estimates associated with the intra coding mode candidates, the inter coding mode candidates, and the palette coding mode candidates;
   generating, with a first codec, a first encoded bitstream of a plurality of bitstreams based on the source video and the coding mode decision;
   generating, with a second codec different from the first codec, a second encoded bitstream of the plurality of bitstreams based on the source video and the coding mode decision; and
   outputting the first encoded bitstream and the second encoded bitstream.

2. The method of claim 1, including:
   generating candidate motion vectors associated with the source video,
   wherein the selecting of the coding mode decision is based on the candidate motion vectors.

3. The method of claim 1, wherein the coding mode decision includes at least one of a coding unit size, a coding unit partition, a transform unit size, a prediction mode, an intra coding mode angle, a motion vector, and a palette table.

4. The method of claim 1, including:
   generating, based on the coding mode decision, first instructions to cause the first codec to generate the first encoded bitstream; and
   generating, based on the coding mode decision, second instructions to cause the second codec to generate the second encoded bitstream, the second instructions different from the first instructions.

5. The method of claim 1, including generating the rate distortion estimates based on forward transforming and quantizing ones of the intra coding mode candidates, the inter coding mode candidates, and the palette coding mode candidates.

6. The method of claim 1, including:
   obtaining an input, the input to specify a combination of bitstream size and video quality associated with encoding the source video, and
   generating the rate distortion estimates based on the combination of the bitstream size and the video quality.

7. A non-transitory computer-readable medium storing comprising computer-executable instructions to cause at least one programmable circuit to at least:
   generate intra coding mode candidates associated with a source video;
   generate inter coding mode candidates associated with the source video;
   generate palette coding mode candidates associated with the source video;
   select a coding mode decision associate with the source video based on rate distortion estimates associated with the intra coding mode candidates, the inter coding mode candidates, and the palette coding mode candidates;
   generate, with a first codec, a first encoded bitstream of a plurality of bitstreams based on the source video and the coding mode decision;
   generate, with a second codec different from the first codec, a second encoded bitstream of the plurality of bitstreams based on the source video and the coding mode decision; and output the first encoded bitstream and the second encoded bitstream.

8. The non-transitory computer-readable medium of claim 7, wherein the instructions are to cause one or more of the at least one programmable circuit to:
generate candidate motion vectors associated with the source video; and
select the coding mode decision based on the candidate motion vectors.

9. The non-transitory computer-readable medium of claim 7, wherein the coding mode decision includes at least one of a coding unit size, a coding unit partition, a transform unit size, a prediction mode, an intra coding mode angle, a motion vector, and a palette table.

10. The non-transitory computer-readable medium of claim 7, wherein the instructions are to cause one or more of the at least one programmable circuit to:
generate, based on the coding mode decision, first instructions to cause the first codec to generate the first encoded bitstream; and
generate, based on the coding mode decision, second instructions to cause the second codec to generate the second encoded bitstream, the second instructions different from the first instructions.

11. The non-transitory computer-readable medium of claim 7, wherein the instructions are to cause one or more of the at least one programmable circuit to generate the rate distortion estimates based on forward transformation and quantization of ones of the intra coding mode candidates, the inter coding mode candidates, and the palette coding mode candidates.

12. The non-transitory computer-readable medium of claim 7, wherein the instructions are to cause one or more of the at least one programmable circuit to:
obtain an input, the input to specify a combination of bitstream size and video quality associated with encoding the source video, and
generate the rate distortion estimates based on the combination of the bitstream size and the video quality.

13. A system comprising:
interface circuitry;
machine-readable instructions; and
at least one programmable circuit to be programmed based on the machine-readable instructions to:
generate intra coding mode candidates associated with a source video;
generate inter coding mode candidates associated with the source video;
generate palette coding mode candidates associated with the source video;
select, a coding mode decision associated with the source video based on rate distortion estimates associated with the intra coding mode candidates, the inter coding mode candidates, and the palette coding mode candidates;
generate, with a first codec, a first encoded bitstream of a plurality of bitstreams based on the source video and the coding mode decision;
generate, with a second codec different from the first codec, a second encoded bitstream of the plurality of bitstreams based on the source video and the coding mode decision; and
output the first encoded bitstream and the second encoded bitstream.

14. The system of claim 13, wherein one or more of the at least one programmable circuit is to:
generate candidate motion vectors associated with the source video; and
select the coding mode decision based on the candidate motion vectors.

15. The system of claim 13, wherein one or more of the at least one programmable circuit is to:
generate, based on the coding mode decision, first instructions to cause the first codec to generate the first encoded bitstream; and
generate, based on the coding mode decision, second instructions to cause the second codec to generate the second encoded bitstream, the second instructions different from the first instructions.

16. The system of claim 13, wherein one or more of the at least one programmable circuit is to generate the rate distortion estimates based on forward transformation and quantization of ones of the intra coding mode candidates, the inter coding mode candidates, and the palette coding mode candidates.

17. The system of claim 13, wherein one or more of the at least one programmable circuit is to:
obtain an input, the input to specify a combination of bitstream size and video quality associated with encoding the source video, and
generate the rate distortion estimates based on the combination of the bitstream size and the video quality.

18. The system of claim 13, wherein the coding mode decision includes at least one of a coding unit size, a coding unit partition, a transform unit size, a prediction mode, an intra coding mode angle, a motion vector, and a palette table.

* * * * *